(12) United States Patent
Zhang

(10) Patent No.: US 9,039,040 B2
(45) Date of Patent: May 26, 2015

(54) LIFTING TROLLEY

(71) Applicant: DONGGUAN PRESTIGE SPORTING PRODUCTS CO., LTD., Dongguan, Guangdong (CN)

(72) Inventor: Zhao Zhang, Dongguan (CN)

(73) Assignee: DONGGUAN PRESTIGE SPORTING PRODUCTS CO., LTD., Dongguan, Guangdong (CN)

( * ) Notice: Subject to any disclaimer, the term of this patent is extended or adjusted under 35 U.S.C. 154(b) by 0 days.

(21) Appl. No.: 14/074,132

(22) Filed: Nov. 7, 2013

(65) Prior Publication Data

US 2014/0312584 A1    Oct. 23, 2014

(30) Foreign Application Priority Data

Apr. 22, 2013  (CN) .......................... 2013 1 0140568

(51) Int. Cl.
*B60R 9/06* (2006.01)
*B62B 1/12* (2006.01)
*B62B 1/00* (2006.01)

(52) U.S. Cl.
CPC .. *B62B 1/12* (2013.01); *B62B 1/008* (2013.01)

(58) Field of Classification Search
USPC ............. 280/47.27, 47.29, 47.34, 47.35, 5.3, 280/5.24, 5.28; 414/490
See application file for complete search history.

(56) References Cited

U.S. PATENT DOCUMENTS

| 4,049,083 | A |   | 9/1977  | Garvey             |         |
|-----------|---|---|---------|--------------------|---------|
| 4,427,094 | A |   | 1/1984  | Winkelblech        |         |
| 5,207,550 | A | * | 5/1993  | Lehman             | 414/420 |
| 5,829,763 | A | * | 11/1998 | Jeavons            | 280/5.3 |
| 5,848,668 | A |   | 12/1998 | Kafrissen et al.   |         |

OTHER PUBLICATIONS

European Patent Office, European Search Report, Jun. 25, 2014.

* cited by examiner

*Primary Examiner* — John Walters
*Assistant Examiner* — James Triggs
(74) *Attorney, Agent, or Firm* — Tim Tingkang Xia, Esq.; Morris, Manning & Martin, LLP

(57) ABSTRACT

The present invention relates to a trolley, and more particularly to a lifting trolley capable of raising and lowering goods. The lifting trolley includes a trolley frame, a drive mechanism, and a bearing mechanism. The bearing mechanism is vertically slidably connected to the trolley frame, and the drive mechanism is disposed on the trolley frame and drives the bearing mechanism to slide vertically. Compared with the prior art, the lifting trolley provided by the present invention saves time and effort, is accurate in positioning, and facilitates conveying of goods.

10 Claims, 5 Drawing Sheets

LIFTING TROLLEY

CROSS-REFERENCE TO RELATED APPLICATION

This application claims priority to and the benefit of, pursuant to 35 U.S.C. §119(a), Chinese Patent Application No. 201310140568.9, filed Apr. 22, 2013, which is incorporated herein by reference in its entirety.

FIELD OF THE INVENTION

The present invention relates generally to a trolley, and more particularly to a lifting trolley capable of raising and lowering goods.

BACKGROUND OF THE INVENTION

A trolley is a vehicle pushed and pulled by human strength for conveying, and is widely used in production and life because the cost is low, the operation is convenient, and the short-distance conveyance of goods is very convenient. However, when goods are large or heavy, the operation process of placing the goods on a carrying mechanism of a trolley or removing the goods from the carrying mechanism of the trolley is difficult, and particularly, it is more difficult to move goods in a high position to the trolley or move goods from the trolley to a high position.

Therefore, currently an improved trolley is available: a carrying mechanism thereof is movably connected to a trolley frame by a chain, and the chain is operated manually through human strength to adjust height of a carrying rack, so as to conveniently convey goods in a high position. However, the trolley also has defects. If the chain is pulled directly by human strength to adjust the height of the carrying rack, a lot of strength is demanded; if a pulley block is disposed on the trolley to reduce the strength needed, a long distance needs to be pulled when the chain is pulled by human strength through the pulley block to adjust the height of the carrying rack, thereby wasting much time.

Therefore, a novel trolley capable of solving the above problems is urgently needed.

SUMMARY OF THE INVENTION

An objective of the present invention is to provide a lifting trolley that saves time and effort. The lifting trolley raises and lowers a carrying rack automatically, so as to conveniently and rapidly convey and handle goods.

In order to achieve the objective, the present invention provides a lifting trolley. The lifting trolley includes a trolley frame, a drive mechanism, and a bearing mechanism. The bearing mechanism is vertically slidably connected to the trolley frame, and the drive mechanism is disposed on the trolley frame and drives the bearing mechanism to slide.

Compared with the prior art, in the lifting trolley provided by the present invention, the drive mechanism drives the bearing mechanism to slide vertically along the trolley frame, so as to replace the human strength based operation in the prior art, thereby saving time and effort. On the other hand, the bearing mechanism of the lifting trolley provided by the present invention is slidably connected to the trolley frame, so that the positioning of the bearing mechanism is accurate, thereby facilitating conveying and handling of goods.

In one embodiment, the drive mechanism includes a screw, a nut, and a power unit, the screw is vertically pivotably connected to the trolley frame, the nut is fixed on the bearing mechanism and is connected through threads to the screw, and the power unit is fixed on one end of the trolley frame and drives the screw to rotate; the drive mechanism drives the screw to rotate to drive the nut to move vertically relative to the screw, so as to drive the bearing mechanism to slide vertically along the trolley frame.

In one embodiment, the drive mechanism further includes a worm shaft and a worm gear, the worm shaft is connected to an output end of the power unit, the worm gear is socket-connected to and fixed on one end of the screw, and the worm gear is engaged with the worm shaft; the output end of the power unit is connected to the worm shaft to drive the worm gear to rotate, so as to change a direction of a driving force of the power unit, so that a mounting position of the power unit may be arbitrarily set according to needs, thereby making the structure of the lifting trolley of the present invention more compact.

In one embodiment, the bearing mechanism includes a connecting plate and a bearing plate, the connecting plate is slidably connected to the trolley frame, and the bearing plate is rotatably connected to the connecting plate; when the lifting trolley is not in use, the bearing plate may be rotated about the connecting plate, so as to be folded, so that the lifting trolley of the present invention has a smaller volume in a non-working state, thereby reducing the area occupied by storage.

In one embodiment, the connecting plate has a stopper portion, and when the bearing plate is unfolded relative to the connecting plate, one end of the bearing plate is pressed against the stopper portion, so as to limit an unfolding position of the bearing plate, thereby loading goods conveniently.

In one embodiment, the lifting trolley further includes support feet, and the support feet are foldably disposed on two sides of a lower end of the trolley frame. When the lifting trolley is in use, the support feet are unfolded, so that the support feet and the trolley frame form multiple support points not on a same line, and therefore supporting and positioning of the lifting trolley on the ground are very reliable, thereby resulting in high safety; when the lifting trolley is not in use, the support feet are folded, so that the volume of the lifting trolley of the present invention is smaller, thereby reducing the area occupied by storage.

In one embodiment, an end of the support foot is provided with a foot mat; when the lifting trolley loads and unloads goods on the uneven ground, the large area of contact between the foot mat and the ground ensures the supporting and positioning of the lifting trolley on the ground.

In one embodiment, the trolley frame includes a main frame body and two transverse supports, the main frame body is vertically disposed, the two transverse supports are symmetrically fixed on the two sides of the lower end of the main frame body respectively, and the support feet are pivotably connected to the transverse supports; the support foot pivots about the transverse support, so as to be unfolded or folded.

In one embodiment, the lifting trolley further includes a wheel, and the wheel is pivotably connected to the lower end of the trolley frame.

In one embodiment, the lifting trolley further includes a handle, and the handle is disposed at an upper end of the trolley frame; the lifting trolley can be conveniently pushed to move by operating the handle.

These and other aspects of the present invention will become apparent from the following description of the preferred embodiment taken in conjunction with the following drawings, although variations and modifications therein may be affected without departing from the spirit and scope of the novel concepts of the invention.

BRIEF DESCRIPTION OF THE DRAWINGS

Further features and benefits of the present invention will be apparent from a detailed description of preferred embodiments thereof taken in conjunction with the following drawings, wherein similar elements are referred to with similar reference numbers, and wherein.

DETAILED DESCRIPTION OF THE INVENTION

Figure 1:
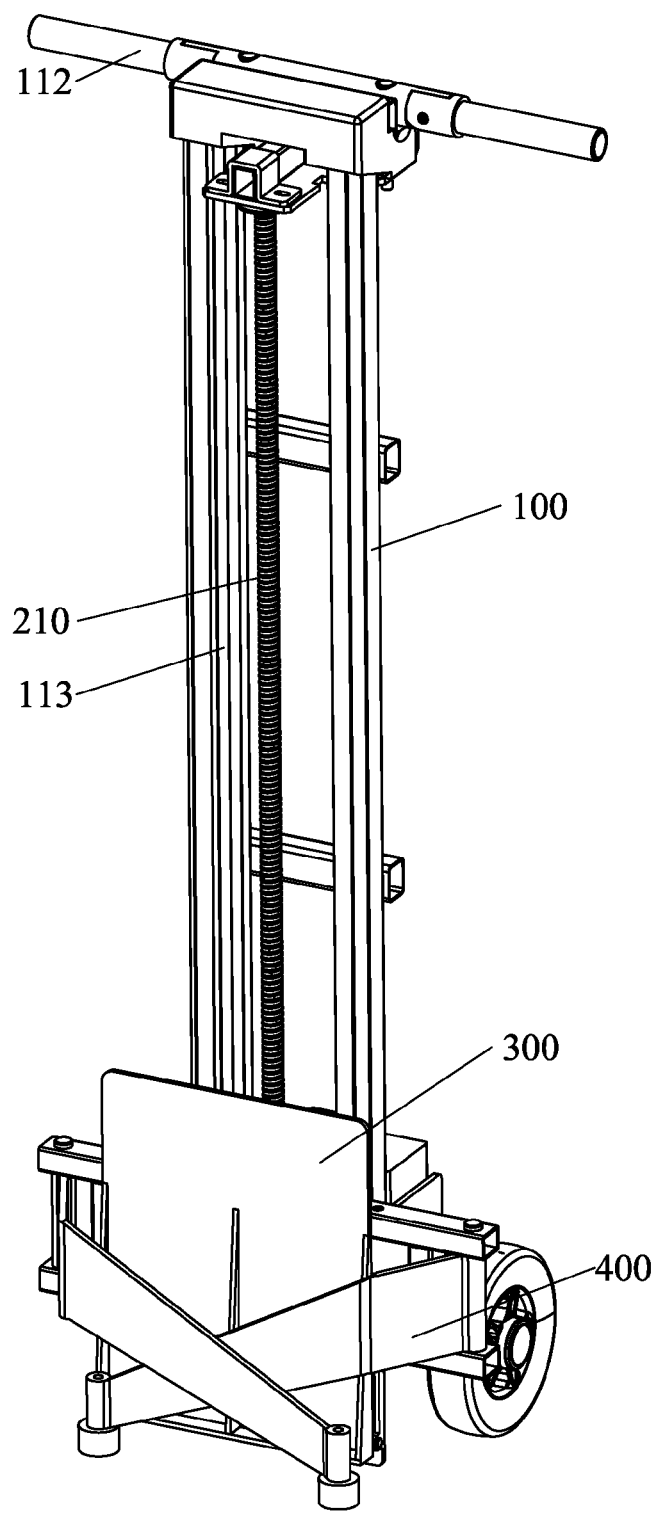
FIG. 1 is a schematic structural view of a lifting trolley according to the present invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

As used herein, "around", "about", "substantially" or "approximately" shall generally mean within 20 percent, In one embodiment within 10 percent, and more In one embodiment within 5 percent of a given value or range. Numerical quantities given herein are approximate, meaning that the term "around", "about" "substantially" or "approximately" can be inferred if not expressly stated.

The description will be made as to the embodiments of the invention in conjunction with the accompanying drawings.

Figure 2:
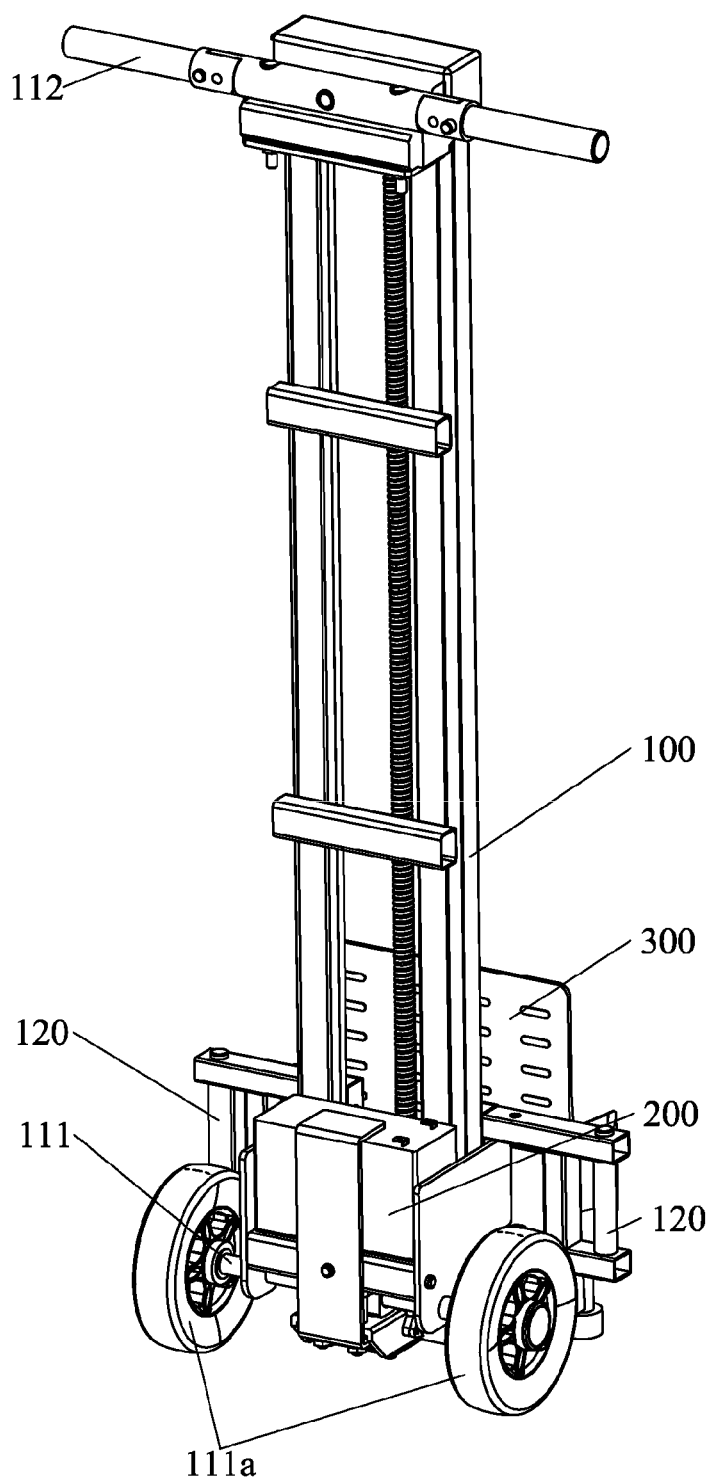
FIG. 2 is a schematic structural view of a lifting trolley according to the present invention in another direction.

A lifting trolley shown in FIG. 1 and FIG. 2 includes a trolley frame 100, a drive mechanism 200, and a bearing mechanism 300. The bearing mechanism 300 is vertically slidably mounted on the trolley frame 100. The drive mechanism 200 is fixed on the trolley frame 100, and drives the bearing mechanism 300 to slide vertically.

The trolley frame 100 includes a main frame body 110 and two transverse supports 120. The main frame body 110 is vertically disposed. The two transverse supports 120 are symmetrically fixed on two sides of a lower end of the main frame body 110 respectively. The lower end of the main frame body 110 is pivotably connected to an axle 111. Two ends of the axle 111 are each connected to a wheel 111a. An upper end of the main frame body 110 is provided with an operation portion 112. The two sides of the main frame body 110 are further provided with a slide groove 113. The bearing mechanism 300 is connected to the slide groove 113 and slides vertically along the slide groove 113. The drive mechanism 200 is fixed on the main frame body 110, and drives the bearing mechanism 300 to slide vertically.

Figure 3:
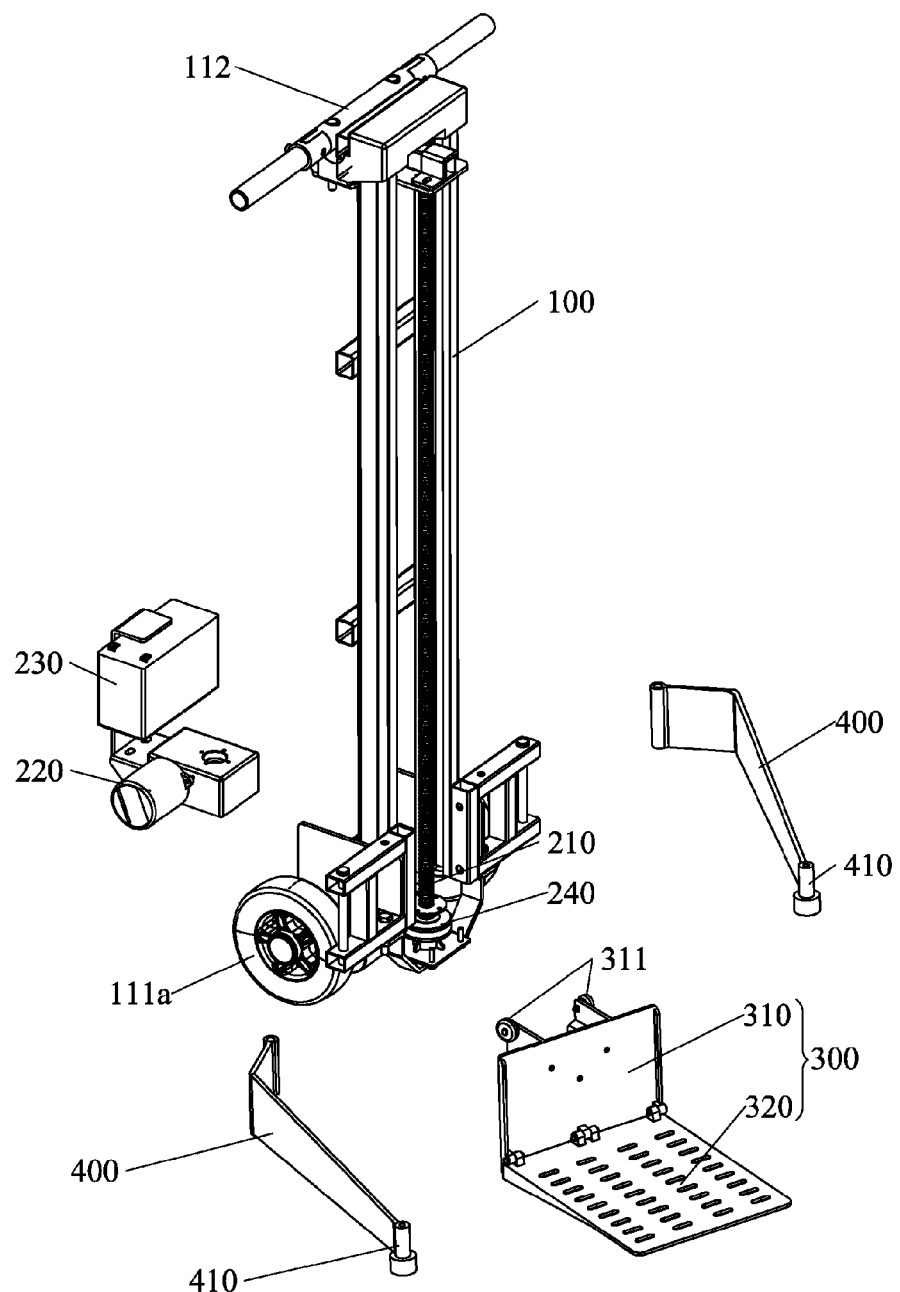
FIG. 3 is a schematic exploded view of a lifting trolley according to the present invention.
Figure 4:
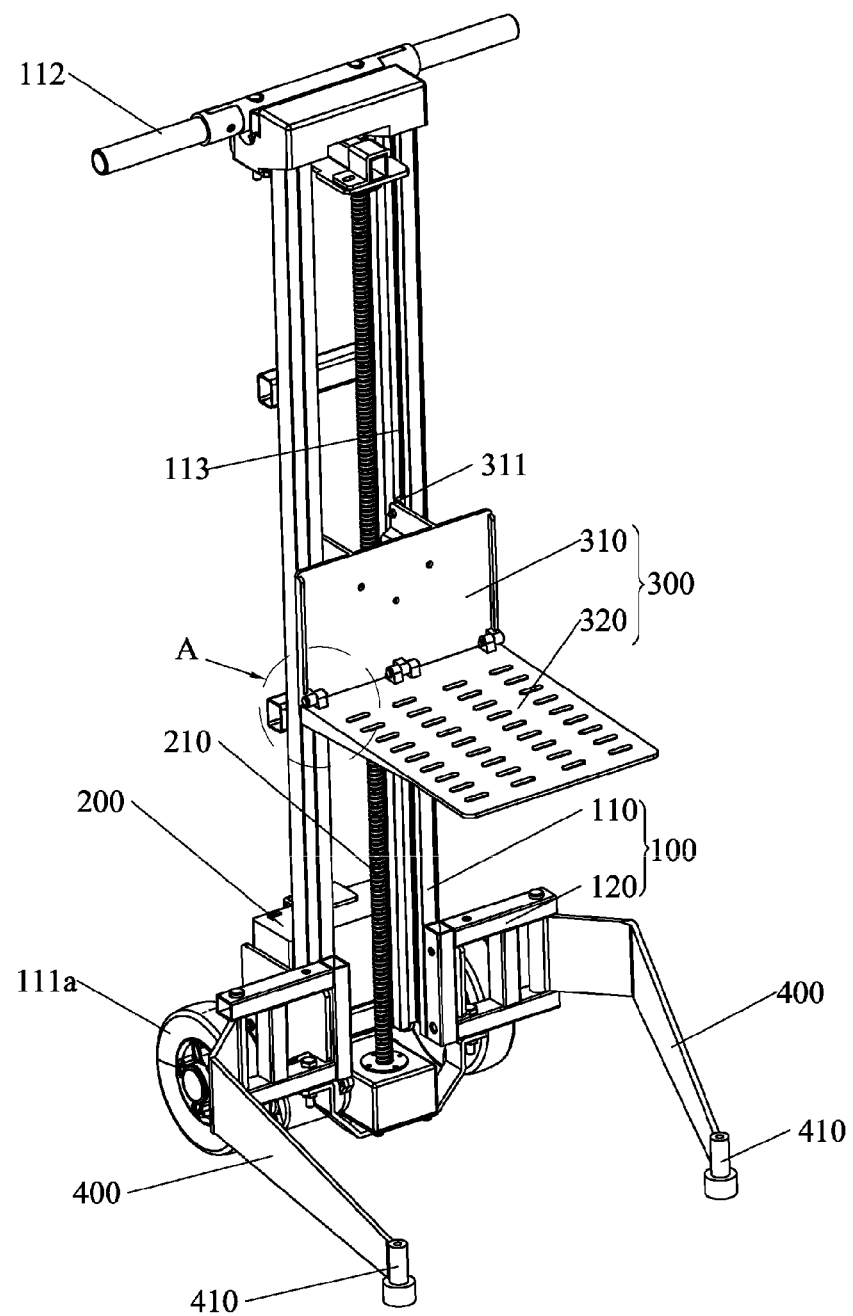
FIG. 4 is a view of a working state of a lifting trolley according to the present invention.

Referring to FIG. 3 to FIG. 4, the drive mechanism 200 includes a screw 210, a nut (not shown), and a power unit 220. The power unit 220 is a motor. The screw 210 is vertically pivotably connected to the main frame body 110. The nut is fixed on the bearing mechanism 300. The nut and the screw 210 are fit-connected to each other. The power unit 220 is fixed on the lower end of the main frame body 110, and drives the screw 210 to rotate, so that the nut and the bearing mechanism 300 fixedly connected to the nut slide vertically along the main frame body 110. Further, the drive mechanism 200 includes a battery 230. The battery 230 is also mounted at the lower end of the main frame body 110. The battery 230 is connected to the power unit 220, so as to provide power for the power unit 220. When the power in the battery 230 is insufficient, the battery 230 may be removed to be replaced with a new battery, and may also be charged definitely.

The drive mechanism 200 further includes a worm shaft (not shown) and a worm gear 240. An output end of the power unit 220 is disposed laterally and perpendicular to the screw 210. The output end of the power unit 220 is connected to the worm shaft. The worm gear 240 is fixedly socket-connected to the screw 210, and the worm gear 240 is engaged with the worm shaft. When the power unit 220 works and drives the worm shaft to rotate, the worm shaft drives the worm gear 240, connected to the worm shaft, to rotate, so as to drive the screw 210 to rotate, so that the nut and the bearing mechanism 300 fixedly connected to the nut vertically slide along the main frame body 110. The power unit 220 is transmission-connected to the screw 210 through the worm shaft and the worm gear 240, so that the laterally disposed power unit 220 drives the vertically disposed screw 210 to rotate. By disposing the worm gear/worm shaft structure, a direction of a driving force of the power unit 220 may be changed, so that a mounting position of the power unit 220 may be arbitrarily set according to needs, thereby making the structure of the lifting trolley of the present invention more compact.

Figure 5:
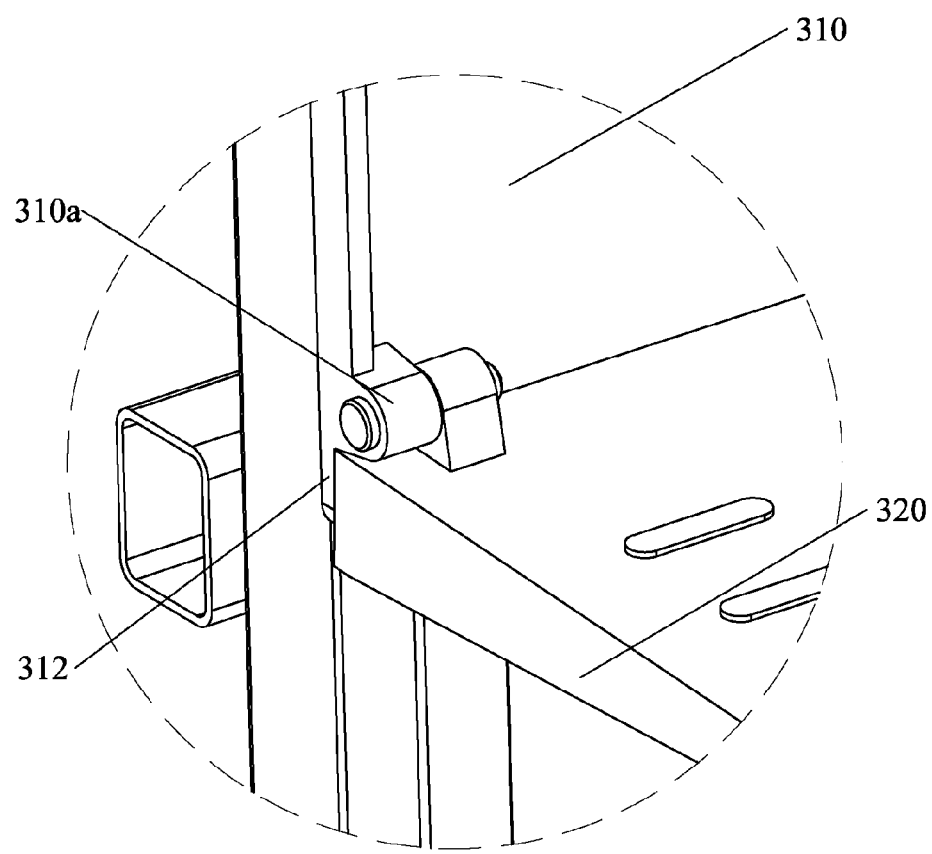
FIG. 5 is an enlarged view of a part A in FIG. 4.

As shown in FIG. 4, the bearing mechanism 300 includes a connecting plate 310 and a bearing plate 320. Slide blocks 311 corresponding to the slide groove 113 are fixed on two sides of the connecting plate 310. The slide block 311 is embedded in the slide groove 113, and may slide vertically along the slide groove 113. The nut corresponding to the screw 210 is fixed on the connecting plate 310. When the screw 210 driven by the power unit 220 rotates, the nut fitting the screw 210 drives the connecting plate 310 to slide vertically. The bearing plate 320 is rotatably connected to the connecting plate 310. When the lifting trolley is not in use, the bearing plate 320 may be rotated about the connecting plate 310, so as to be folded, so that the lifting trolley has a smaller volume in a non-working state, thereby reducing the area occupied by storage; when the lifting trolley is in use, the bearing plate 320 may be rotated about the connecting plate 310, so as to be unfolded to load and unload goods. Referring to FIG. 5, the connecting plate 310 has a stopper portion 312. The bearing plate 320 rotates about the connecting plate 310 until the bearing plate 320 is pressed against the stopper portion 312, so as to limit an unfolding position of the bearing plate 320. Further, the connecting plate 310 has a pivotable connecting position 310a, and the bearing plate 320 is pivotably connected to the connecting plate 310 at the pivotable connecting position 310a. A distance exists between the pivotable connecting position 310a and a side edge of the connecting plate 310, and the stopper portion 312 is formed between the pivotable connecting position 310a and the side edge of the connecting plate 310. The bearing plate 320 pivots about the connecting plate 310 until the side edge of the bearing plate 320 is pressed against the stopper portion 312, and at the moment an angle being substantially 90° is formed between the bearing plate 320 and the connecting plate 310.

As shown in FIG. 3 and FIG. 4, the lifting trolley further includes two support feet 400. The two support feet 400 are symmetrically pivotably connected to the two transverse supports 120. When the two support feet 400 pivot and unfold towards the outside of the main frame body 110, the support feet 400 and the trolley frame 100 form multiple support points not on a same line, so that supporting and positioning of the lifting trolley of the present invention on the ground are very reliable, thereby resulting in high safety. When the lifting trolley is not in use, the two support feet 400 may pivot and be folded towards the inside of the main frame body 110, so that the volume of the lifting trolley of the present invention is smaller, thereby reducing the area occupied by storage. In one embodiment, an end of the support foot 400 is provided with a foot mat 410. A side, contacting the ground, of the foot mat 410 is of a planar structure with a large area, so that when the lifting trolley loads and unloads goods on the uneven ground, the large area of contact between the foot mat 410 and the ground ensures the supporting and positioning of the lifting trolley on the ground.

The following illustrates in detail a working process of the lifting trolley of the present invention with reference to FIG. 1 to FIG. 5. In a non-working state, the lifting trolley is in a folded state shown in FIG. 1; when the lifting trolley is in use, the two support feet 400 pivot and unfold towards the outside of the main frame body 110, and the two foot mats 410 are supported on the ground and together with the two wheels 110a form four positioning points not on a same line, so as to support and position the lifting trolley, so that the lifting trolley is in an upright state; the bearing plate 320 is rotated about the connecting plate 310 until one end of the bearing plate 320 is pressed against the stopper portion 312, and at the moment, an angle being substantially 90° is formed between the bearing plate 320 and the connecting plate 310, as shown in FIG. 4; the lifting trolley is pushed to to-be-conveyed goods, the power unit 220 is enabled, the power unit 220 drives, through transmission performed by the worm gear/worm shaft, the screw 210 to rotate, the screw 210 rotates to drive the nut to drive the connecting plate 310 and the bearing plate 320, and the connecting plate 310 and the bearing plate 320 slide along the trolley frame 100 so as to be flush with the to-be-conveyed goods; the lifting trolley is pushed forward until the bearing plate 320 holds up the to-be-conveyed goods from the bottom; the lifting trolley is pushed to a destination of the conveying; the power unit 220 is enabled, the power unit 220 drives, through transmission performed by the worm gear/worm shaft, the screw 210 to rotate, the screw 210 drives the nut to drive the connecting plate 310 and the bearing plate 320, and the connecting plate 310 and the bearing plate 320 slide along the trolley frame 100 to a target position; the lifting trolley is pushed backwards until the bearing plate 320 departs from the goods. A conveying process of the lifting trolley of the present invention is completed above.

Compared with the prior art, in the lifting trolley provided by the present invention, the bearing mechanism 300 is slidably connected to the trolley frame 100, the power unit 220 is used to drive the worm shaft and the worm gear 240, the horizontal output of the power unit 220 is converted into vertical output, and the screw 210 and the nut are used to drive the bearing mechanism 300 to slide vertically along the trolley frame 100, so as to replace the human strength based operation in the prior art, thereby saving time and effort; further, the screw 210 fits the nut, so that the positioning of the bearing mechanism 300 is accurate, thereby facilitating conveying and handling of goods.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

What is claimed is:

1. A lifting trolley, comprising:
    a trolley frame;
    a drive mechanism; and
    a bearing mechanism,
    wherein the bearing mechanism is vertically slidably connected to the trolley frame, and the drive mechanism is disposed on the trolley frame and drives the bearing mechanism to slide; and
    wherein the drive mechanism comprises a screw, a nut, and a power unit, the screw is vertically pivotably connected to the trolley frame, the nut is fixed on the bearing mechanism and is connected through threads to the screw, and the power unit is fixed on one end of the trolley frame and drives the screw to rotate.

2. The lifting trolley according to claim 1, wherein the drive mechanism further comprises a worm shaft and a worm gear, the worm shaft is connected to an output end of the power unit, the worm gear is socket-connected to and fixed on one end of the screw, and the worm gear is engaged with the worm shaft.

3. A lifting trolley, comprising:
    a trolley frame;
    a drive mechanism; and
    a bearing mechanism,
    wherein the bearing mechanism is vertically slidably connected to the trolley frame, and the drive mechanism is disposed on the trolley frame and drives the bearing mechanism to slide; and
    wherein the bearing mechanism comprises a connecting plate and a bearing plate, the connecting plate is slidably connected to the trolley frame, and the bearing plate is rotatably connected to the connecting plate.

4. The lifting trolley according to claim 3, wherein the connecting plate has a stopper portion, and when the bearing plate is unfolded relative to the connecting plate, one end of the bearing plate is pressed against the stopper portion.

5. A lifting trolley, comprising:
    a trolley frame;
    a drive mechanism;
    a bearing mechanism, and
    support feet,
    wherein the bearing mechanism is vertically slidably connected to the trolley frame, and the drive mechanism is disposed on the trolley frame and drives the bearing mechanism to slide;
    wherein the support feet are foldably disposed on two sides of a lower end of the trolley frame; and
    wherein the trolley frame comprises a main frame body and two transverse supports, the main frame body is vertically disposed, the two transverse supports are symmetrically fixed on the two sides of the lower end of the main frame body respectively, and the support feet are pivotably connected to the transverse supports.

6. The lifting trolley according to claim 5, wherein an end of the support foot is provided with a foot mat.

7. The lifting trolley according to claim 1, wherein the lifting trolley further comprises a wheel, and the wheel is pivotably connected to a lower end of the trolley frame.

8. The lifting trolley according to claim 1, wherein the lifting trolley further comprises a handle, and the handle is disposed at an upper end of the trolley frame.

9. The lifting trolley according to claim 3, wherein the lifting trolley further comprises a wheel, and the wheel is pivotably connected to a lower end of the trolley frame.

10. The lifting trolley according to claim 3, wherein the lifting trolley further comprises a handle, and the handle is disposed at an upper end of the trolley frame.

* * * * *